(12) United States Patent
Rajala et al.

(10) Patent No.: US 8,865,265 B2
(45) Date of Patent: Oct. 21, 2014

(54) PROCESS AND APPARATUS FOR COATING GLASS

(75) Inventors: Markku Rajala, Vantaa (FI); Jorma Keskinen, Tampere (FI)

(73) Assignee: Beneq Oy, Vantaa (FI)

( * ) Notice: Subject to any disclaimer, the term of this patent is extended or adjusted under 35 U.S.C. 154(b) by 137 days.

(21) Appl. No.: 13/130,006

(22) PCT Filed: Dec. 21, 2009

(86) PCT No.: PCT/FI2009/051023
§ 371 (c)(1),
(2), (4) Date: May 18, 2011

(87) PCT Pub. No.: WO2010/072899
PCT Pub. Date: Jul. 1, 2010

(65) Prior Publication Data
US 2011/0223344 A1    Sep. 15, 2011

(30) Foreign Application Priority Data

Dec. 22, 2008 (FI) .................................. 20080674

(51) Int. Cl.
| | |
|---|---|
| B05D 1/04 | (2006.01) |
| B05B 5/025 | (2006.01) |
| B05B 5/04 | (2006.01) |
| B05D 7/24 | (2006.01) |
| B05D 7/00 | (2006.01) |
| C03C 17/00 | (2006.01) |
| B05B 5/08 | (2006.01) |
| B05B 15/04 | (2006.01) |
| B05B 5/10 | (2006.01) |
| B05B 13/02 | (2006.01) |
| B05B 5/03 | (2006.01) |

(52) U.S. Cl.
CPC ............. *B05B 13/0221* (2013.01); *B05B 5/082* (2013.01); *B05B 15/04* (2013.01); *C03C 2218/115* (2013.01); *C03C 2218/112* (2013.01); *B05B 5/10* (2013.01); *C03C 17/002* (2013.01); *B05B 5/03* (2013.01)
USPC ........... 427/458; 427/483; 427/484; 427/485; 427/486; 65/60.1

(58) Field of Classification Search
USPC ................ 427/458, 475, 483–486, 226, 229; 118/621, 620; 65/60.1–60.7; 239/690–708
See application file for complete search history.

(56) References Cited

U.S. PATENT DOCUMENTS 3,219,276 A * 11/1965 Norris .......................... 239/752
3,606,972 A    9/1971 Ferrant
(Continued)

FOREIGN PATENT DOCUMENTS

DE    32 11 282 A1    9/1983
EP    0 431 249 A2    6/1991
(Continued)

OTHER PUBLICATIONS

International Search Report dated Apr. 7, 2010 in International Application No. PCT/FI2009/051023.
(Continued)

*Primary Examiner* — Frederick Parker
*Assistant Examiner* — Ann Disarro
(74) *Attorney, Agent, or Firm* — Oliff PLC

(57) ABSTRACT

A process and an apparatus for coating glass by means of a method using at least one or more liquid raw materials which react essentially on at least a portion of the glass substrate forming a coating on it. At least part of the liquid raw materials is atomized to droplets with one or more two-fluid atomizer and at least a fraction of the gas used in the one or more two-fluid atomizers is electrically charged such that at least a fraction of the droplets become electrically charged during or after the atomization. According to the invention the droplets are formed into a separately created electric field.

14 Claims, 4 Drawing Sheets

(56) References Cited

U.S. PATENT DOCUMENTS

| | | | |
|---|---|---|---|
| 4,284,495 A | 8/1981 | Newton | |
| 6,349,668 B1* | 2/2002 | Sun et al. | 118/723 R |
| 6,800,333 B2* | 10/2004 | Choy et al. | 427/475 |
| 2002/0106452 A1 | 8/2002 | Choy et al. | |
| 2005/0147749 A1* | 7/2005 | Liu et al. | 427/248.1 |

FOREIGN PATENT DOCUMENTS

| | | |
|---|---|---|
| GB | 1 382 801 | 2/1975 |
| JP | A-61-11250 | 1/1986 |
| JP | A-2004-298667 | 10/2004 |

OTHER PUBLICATIONS

Chinese Office Action dated Apr. 15, 2013 from Chinese Patent Application No. 200980151981.7 (with partial English-language translation).

English-language translation of Japanese Office Action dated Dec. 17, 2013 from Japanese Patent Application No. 2011-541529.

Sears et al.; "Mechanics of Film Formation During the Spray Pyrolysis of Tin Oxide;" *Thin Solid Films;* 1988; pp. 265-277; vol. 165.

Taiwanese Office Action dated Mar. 17, 2014 from Taiwanese Patent Application No. 098143856 (with English-language translation).

European Search Report dated Apr. 14, 2014 from European Patent Application No. 09834181.1.

* cited by examiner

PROCESS AND APPARATUS FOR COATING GLASS

FIELD OF THE INVENTION

The present invention relates to a process for coating glass and specifically to a process for coating glass using at least one or more liquid raw materials which react essentially on at least a portion of the glass surface forming a coating on it, the process comprising atomizing at least a part of the liquid raw materials to droplets with one or more two-fluid atomizer and electrically charging at least a fraction of the gas used in the one or more two-fluid atomizers such that at least a fraction of the droplets become electrically charged during or after the atomization. The present invention further relates to an apparatus for coating glass and specifically to an apparatus for coating glass using at least one or more liquid raw materials which react essentially on at least a portion of the glass surface forming a coating on it, the apparatus comprising one or more two-fluid atomizers for least atomizing at least a part of the liquid raw materials to droplets and charging means for electrically charging at least a fraction of the gas used in the one or more two: fluid atomizers such that at least a fraction of the droplets become electrically charged during or after the atomization.

BACKGROUND OF THE INVENTION

Coated glass is manufactured for various purposes, the coating being selected to confer some particular desired property of the glass. Important examples of coatings for architectural and automotive glass are those designed to reduce the emissivity of the coated face in respect to infrared radiation (low-e coatings), coatings designed to reduce the total solar energy transmittance and coatings designed to provide a hydrophilic or self-cleaning glass surface. For photovoltaic applications glasses with transparent conductive oxide (TCO) coatings are very important. It is known that for example fluorine doped tin oxide (FTO) or aluminum doped zinc oxide coatings serve well for TCO and low-e coatings, titanium oxide coatings, especially with anatase crystal structure serve for self-cleaning coatings and iron-cobalt-chrome-based oxide coatings serve for near-infrared reflection coatings.

The coatings which are applied to glass should usually have a high and uniform optical quality. The coatings are usually applied to a thickness of between about 10 nm and 1500 nm, depending on the application. The coating material usually has a refractive index different from that of the glass material and thus variations in the thickness of a coating can give rise to objectionable interference effects, so uniform thickness is important for good optical quality.

Coatings on glass can be divided into two different groups, soft coatings and hard coatings. Soft coatings are typically applied by sputtering and their adhesion to the glass surface is rather poor. Hard coatings which typically have an outstanding adhesion and high abrasion resistance are typically applied by pyrolytic methods, such as chemical vapor deposition (CVD) and spray-pyrolysis.

In CVD the coating precursor material is in vapor phase and the vapor is caused to enter a coating chamber and flow as a well controlled and uniform current with the substrate being coated. The coating formation rate is rather slow and thus the process is typically carried out at temperatures exceeding 650° C., as the coating growth rates typically increases exponentially as the temperature is raised. The rather high temperature requirement makes CVD—process rather unsuitable for glass coating operations made outside the float glass process, i.e. for off-line coating applications.

In order to form thick coatings, typically coatings with thickness higher than 400 nm, at temperatures lower than approximately 650° C., it is conventional to use a spray coating apparatus for spraying a stream of droplets of coating precursor solution onto the substrate. The conventional spray pyrolysis system, however, suffers from a number of disadvantages such as the generation of steep thermal gradients and problems with the coating uniformity and quality. A great improvement to the process can be achieved by decreasing the size of the droplets as described in the applicant's currently non-public Finnish patent applications FI20071003 and FI20080217.

Another way of improving the spray pyrolysis process is to use electrostatic spray deposition. German patent publication DE 32 11 282 A1, Albers, August, 29.9.1983, describes a process for coating glass by particles or droplets where the particles or droplets have a different electrical potential than the glass. The temperature of the glass is between 400 and 900° C. The particle or droplet charging is carried out by an electrostatic spray gun conventionally used in coating conductive surfaces in a diverse range of applications like automotive finishes.

There are three primary ways in which liquids are charged in electrostatic spraying: direct conduction, corona, and induction. In direct conduction the spray material must have a relatively high conductivity and the voltage is applied to the source of the sprayed material. The spray is emitted from the spraying nozzle already charged and atomizes instantly. In a corona charging system the sprayed droplets are charged after atomization by passing through a corona field. This is an effective technique, but it poses safety hazards due to a high probability of arcs. Another drawback of this technique is that the liquid can land on the corona-producing electrode prior to charging causing a decrease in performance. Thus corona charging is usually used mainly with dry particles rather than with droplets. In induction charging the voltage is applied in proximity to the nozzle so that the liquid travels near the source and picks up some of the electric charge. To avoid current flowing back to the feed tank, the material has to have a high bulk resistivity. Due to its comparatively low charging efficiencies, mechanical assistance is required to atomize the spray, typically by rotary atomization, air assisted atomization, or a combination of both.

The voltages used in the electrostatic spraying are typically very high. The publication DE 32 11 282 A1 describes a voltage of 90 kV used in the spraying apparatus.

Electrostatic spraying would allow considerable improvement to homogeneous droplet deposition in spray pyrolysis. However, the practical problems of the current electrostatic spraying processes, mainly due to the high voltage, high process temperatures and soiling of undesired areas, have been so difficult that the electrostatic spraying process is not used in the production of pyrolytic glass coatings.

The international application WO 2004/094324 A1, Liekki Oy, Apr. 11, 2004, describes a method for charging particles, which particles are used for processing a material. According to the publication, an electrical charge is introduced in the particle formation with the gas reacting with the reactant at that stage of the process in which the gaseous reactant is oxidized and the particles are formed. Advantageously the electrical charge is introduced in the process with oxidizing gas that reacts with the reactant, such as oxygen. The charge is produced in the gas by means of a suitable charging method, preferably by a corona charger. The publication does not describe droplet charging.

In all spraying-based coating techniques it is preferable not to coat undesired parts of the object and the coating chamber. Especially when the coating process is based on small droplets, as described in the applicant's currently non-public Finnish patent applications FI20071003 and FI20080217, diffusion of the small droplets creates a tendency for the small droplets to penetrate also to undesired sections, which creates a need for shielding or cleaning these sections.

According to the prior art the droplets may also be electrically charged by electrically charging the gas used in a two-fluid atomizers such that the droplets become electrically charged. The electrically charged droplets are then deposited on the surface of the substrate using electrostatic forces by charging the substrate with opposite polarity in relation to the droplets. Accordingly the droplets and the substrate are charged with opposite polarity for enhancing the deposition of the droplets on the surface.

The problem with above mentioned prior art solutions is that when the substrate is charged for depositing the charged droplets on the substrate the deposition efficiency and the uniformity is substrate specific. This is due to the fact that each substrate material has different charging properties or electrical properties including ability to carry charge. Also the substrate thickness and volume may influence the deposition of the charged droplets and thus the formation of the coating on the substrate. Therefore the process and apparatus for coating a substrate using charged droplets does not work similarly to all substrates. This makes the coating difficult to control. Furthermore, the apparatus and process becomes complicated as each substrate has to be charged before the deposition of the charged droplets.

BRIEF DESCRIPTION OF THE INVENTION

An object of the present invention is to provide a process and an apparatus for solving the above problems. The objects of the present invention are achieved by a process characterized in that the process further comprises providing a separately created electrical field and feeding the droplets formed with the two-fluid atomizer into the separately created electrical field for depositing at least a fraction of the electrically charged droplets on the said portion of the glass surface by electrostatic forces. The object of the present invention are further achieved by an apparatus characterized in that the apparatus further comprises a separately created electrical field for depositing at least a fraction of the electrically charged droplets on the said portion of the glass surface by electrostatic forces.

The preferred embodiments of the invention are disclosed in the dependent claims.

The main purpose of the present invention is to introduce a process and an apparatus to be used in coating glass, especially in coating glass by spray-pyrolysis method. The coating is formed from an aerosol depositing on the glass substrate, liquid raw materials are atomized to droplets and the droplets in the aerosol react substantially on the glass surface so that a coating is formed on the glass substrate. According to the present invention the droplets are charged and the charged droplets are at least partly deposited on the glass substrate utilizing electrostatic forces. Liquid raw materials are atomized to droplets with a two-fluid atomizer and at least a fraction of the gas used for atomization is electrically charged. The charged gas then charges the droplets during and after the atomization step. The charged droplets are deposited on the said portion of the surface of the glass by at least electrostatic forces utilizing a separate electrical field.

It is advantageous to carry out the electrical charging of the atomizing air as close to the nozzle exit as possible, because this minimizes ion loss to the conduit walls. In the atomizing nozzle the charge is distributed evenly in the produced droplets and the charge also has as much time as possible to transfer from the gas to the droplet.

In a preferred embodiment of the invention the charging of the atomizing gas is performed in the atomizer nozzle by means of corona charge. Said charging makes it possible to obtain high charge density, an even charge field and minimizing breakdown liability simultaneously. In a preferred embodiment the speed of the gas flowing through the atomizer nozzle and the charging member is extremely high, which, in turn, has an advantageous effect on the corona discharge. High flow rate of gas at the corona point is very valuable from the point of view of charging, because thus e.g. the created ions drift quickly away from the neighbourhood of the corona. This reduction of the space charging caused by ions decreases the electric field attenuating the discharge forming around the corona electrode and thus increses the required corona voltage. The diminished voltage requirement, in turn, reduces the risk for electrical breakdown and also reduces the electric power required for maintaining the discharge. By charging the high-velocity gas in the atomizer nozzle it is also possible to reduce the transfer of the charge to the structures, when compared to a situation where the charge is produced before the atomizer nozzle. Yet another advantage of the high-velocity atomizer gas is the greater velocity difference between the gas and the liquid which, in turn, decreases the droplet size.

To achieve the deposition of the droplets on the glass surface by electrostatic forces a separate electrical field is provided. According to the present invention the charged droplets are fed into the separate electrical field by one or more two-fluid atomizers. The one or more two-fluid atomizers may be arranged in connection of the separate electrical field such that the liquid raw materials are atomized into the separate electrical field. The separate electrical field is provided between a first and second electrodes and the separate electrical field is further arranged to receive at least a portion of the glass. The charged droplets are conveyed to the glass surface by at least electrostatic forces generated to the charged droplets by the separate electrical field.

In the present invention electrostatic forces are used to deposit droplets on the glass surface such that at least liquid raw materials react essentially on at least a portion of the glass surface forming a coating on it. The glass or the glass surface or the surface layer of the glass may be heated to a coating temperature or to at least the annealing temperature of the said glass. Also the charged droplets may be heated which enhances liquid evaporation from the droplets. This will decrease the droplet size. At some level the charge in the small droplet becomes so high that the droplet will disintegrate to several smaller droplets. The smaller the droplets are, the faster the coating growth rate will be and thus this phenomenon is advantageous for the coating growth.

The charged droplets are deposited by using a separate electrostatic field generated between a first electrode and a second electrode, where the electrodes are positioned such that the electric field generated between the electrodes will drive the charged droplets to the glass surface.

The advantage of the present invention is that the separate electrical field forms easily controlled and predictable electrical forces for driving the charged droplets irrespective of the material properties of the glass. Furthermore the separate electrical field eliminates the requirement for charging the glass. This simplifies and speeds up the coating process. Also the apparatus for coating becomes less complicated as glass itself is not charged.

An additional advantage of the present invention is that it enables producing uniform coatings to the glass. The process also solves the problem of high voltage required in conventional electrostatic spraying. Using such separate electrical field, external to the electrical field formed by the charged droplets will allow a degree of freedom to the process and apparatus. The external field may be placed at distance from the atomizer nozzle and thus more time is provided for droplet charging. The relatively small distances used between the electrodes generate a reasonably high electrical field intensity.

BRIEF DESCRIPTION OF THE DRAWINGS

In the following, the invention will be described in more detail with reference to the enclosed drawings, in which.

For the sake of clarity, the figures only show the details necessary for understanding the invention. The structures and details which are not necessary for understanding the invention and which are obvious for a person skilled in the art have been omitted from the figures in order to emphasize the characteristics of the invention.

DETAILED DESCRIPTION OF THE INVENTION

According to the invention, at least liquid raw materials react essentially on at least a portion of the glass surface forming a coating on it. The glass surface may be heated to at least the annealing temperature of the said glass. The liquid raw material is atomized to droplets with one or more two-fluid atomizer and at least a fraction of the gas used for atomization is electrically charged. The charged gas then charges the droplets during and after the atomization step. The charged droplets are deposited on the said portion by at least electrostatic forces.

Figure 1:
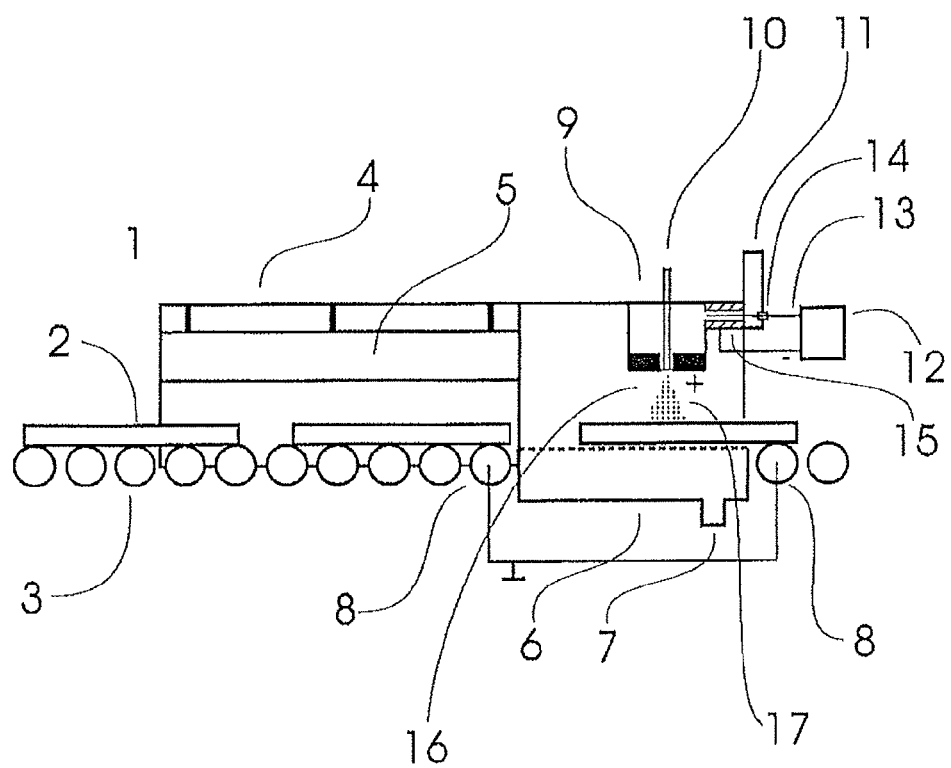
FIG. 1 shows a schematic drawing of an apparatus for providing a coating on the preferred surface of a flat glass object.

FIG. 1 shows, in principle, an apparatus, where the formation of a coating on a top surface of glass 2 in a coating apparatus 1. Flat glass piece 2, with a typical size of 1100 mm×1400 mm, moves from left to right. Glass 2 first enters a heating furnace 4 including a heater 5. The heater 5 may be based on radiation, convection or similar. In the heating furnace 4 glass 2 heats to a temperature which is higher than the annealing point (annealing temperature) of the glass 2. The annealing point depends on the composition of glass 2 and is typically about 500° C. for soda-lime glass and about 1100° C. for fused silica. Glass 2 then enters the coating unit 9 where a spray 17 is deposited on the top surface of glass 2. The glass may also be heated to a coating temperature different from the annealing temperature. The coating temperature of the glass 2 depends on the provided coating or coating material and the composition of the glass. Thus the coating temperature may be at least 100° C., preferably at least 200° C. and most preferably at least 300° C. The following coating materials and coating temperatures are disclosed as examples:

| | |
|---|---|
| Antimony doped tin oxide (ATO) | 200-400° C. |
| Indium doped tin oxide (ITO) | 300-400° C. |
| Boron doped zinc oxide | 200-400° C. |
| Fluorine doped zinc oxide | 400-500° C. |
| Aluminum doped zinc oxide (AZO) | 400-500° C. |
| Fluorine doped tin oxide (FTO) | 500-800° C. |
| Titanium dioxide | 500-800° C. |
| Piioxynitridi (SiO$x$N$y$) | 500-800° C. |
| Piioxykarbidi (SiO$x$C$y$) | 500-800° C. |

An air floating device 6 floats the glass substrate 2 by a gas blowing motion, the gas being fed through conduit 7. The spray is formed by a two-fluid atomizer 16. Precursor liquid is fed into the atomizer 16 through conduit 10 and atomizing gas is fed into the atomizer 16 through conduit 11. The atomizing gas passes a corona charger 13 into which a high voltage is fed from the power source 12. The corona electrode 13 is separated from the casing of the coating unit 9 by an electrical insulator 14. The counter electrode 15 preferably forms a part of the charging nozzle, its surface forming the inner wall of the nozzle. When the atomizing gas flows via the corona electrode 13, it is electrically charged. The corona charging makes it possible to attain high charge densities, an even charge field and minimizing of breakdown liability simultaneously. Furthermore, corona charging makes it possible to produce both positively and negatively charged droplets by means of the same apparatus 1.

In the atomizer 16 it is advantageous to use very high flow rate of the atomizing gas, advantageously from 50 m/s to sonic velocity. The high gas flow rate has several advantages. Firstly, it is very advantageous from the point of views of charging, because thus e.g. the created ions drift quickly away from the vicinity of the corona. This expulsion of the space charging caused by ions decreases the electric field attenuating the discharge and forming around the corona electrode 13 and thereby also the required corona voltage. For example by feeding nitrogen as atomizing gas through conduit 11 with a flow rate near the corona electrode 13 being roughly 150 m/s, it is possible to use approximately 5 kV as the charging voltage of the corona electrode 13. Secondly, the high flow rate reduces the ion loss to the surroundings of the atomizer 16, with a preferable residence time of the charged gas in the atomizer being 1 m/s or less. Thirdly, the high flow rate at the exit nozzle of the atomizer 16 reduces the droplet size.

There may be areas on the glass surface where coating is undesirable. For example when a glass plate is coated with a Transparent Conductive Oxide (TCO) coating, it is advantageous to coat only one surface of the glass plate. The invention includes a process where a second portion of glass, where the coating is unwanted, is charged with the same polarity as the droplets and the charge decreases the deposition of the charged droplets to the second portion. The deposition of the charged droplets to the undesired parts of the glass object, i.e. those parts of the glass object where no coating formation is wanted, can be decreased by charging the undesired portion with a charge having the same polarity as the droplets. In a preferred embodiment a glass plate having a top surface facing towards the coating nozzle and a bottom surface facing on the opposite direction is transferred in the coating unit by a gas-floating transportation device. The gas used for floating the glass plate is charged with the same polarity as the droplets, which minimizes droplet deposition on the bottom surface of the glass plate.

Figure 2:
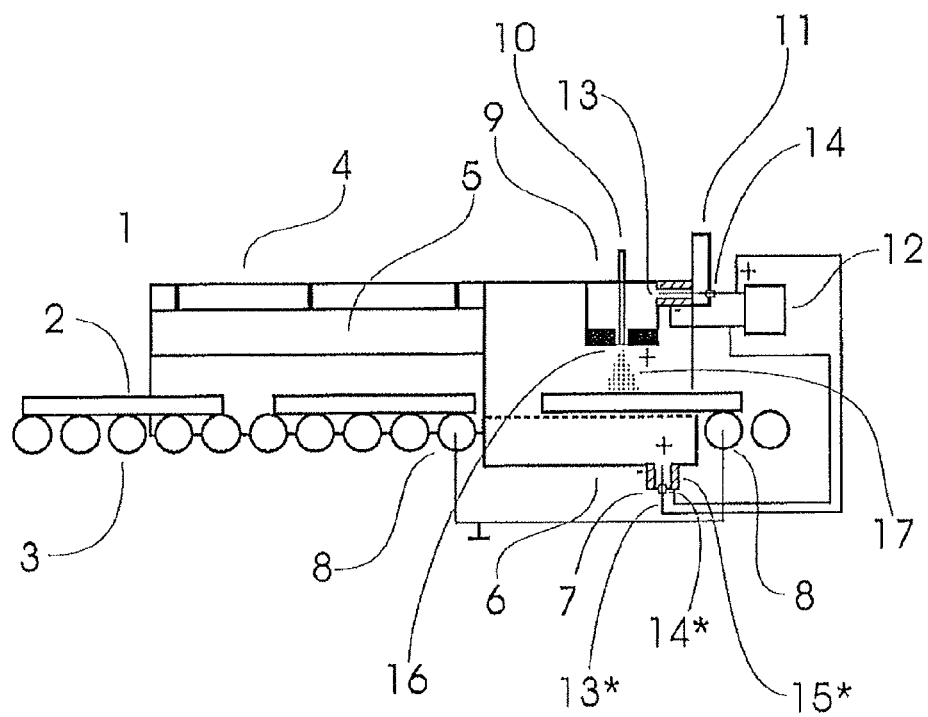
FIG. 2 shows a schematic drawing of an apparatus for providing a coating on the preferred surface and for rejecting coating formation on the undesired surface.

FIG. 2 shows, in principle, an apparatus in which glass heating movement and coating is carried out in the same way as described in connection with FIG. 1. In addition another corona charger 13* is used to charge the air used in the air floating device 6. FIG. 2 shows an embodiment where the corona charger 13* uses the same power supply 12 as the corona charger 13. It is, however, obvious for a person skilled in the art that also another power supply, with different voltage, may be used. It is essential to the invention that the air supporting the glass plate 2 charges the bottom surface of the glass substrate 2 with the same polarity as the droplets 17 are charged. The rejection force caused by the charges with same polarity decreases the formation of the coating to the bottom surface of the glass substrate 2. Obviously, also only a more restricted area of the glass substrate may be charged.

Figure 3:
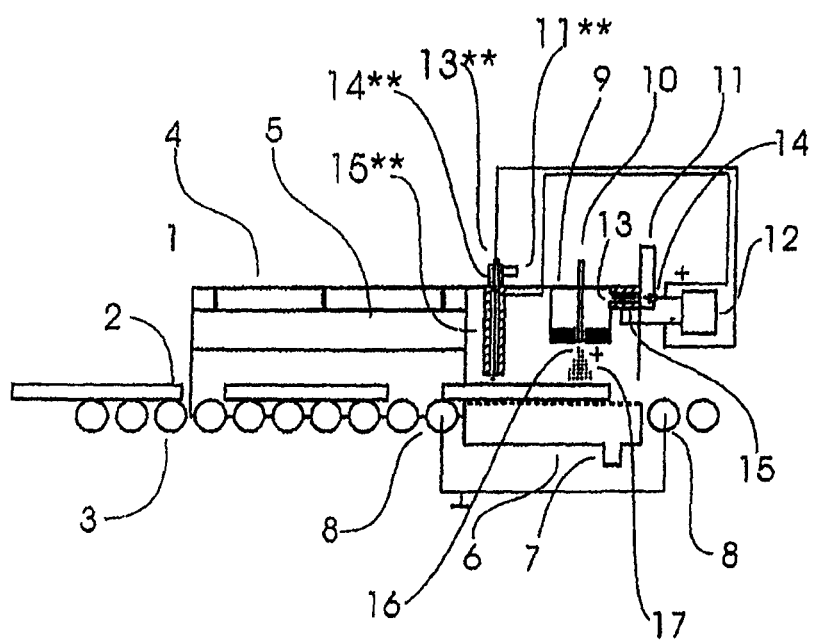
FIG. 3 shows a schematic drawing of an apparatus for enhanced formation of a coating on the preferred surface.

FIG. 3 shows, in principle, a prior art apparatus in which the electrostatic forces for the droplet deposition are enhanced by charging the top surface of the glass substrate 2 with a charge opposite to the charge of the droplets 17. Preferably the charging is carried out by charging air passing through the conduit 11 by a corona charger 13. As shown in FIG. 3, the corona charger 13 has an opposite polarity to the corona charger 13. FIG. 3 shows an embodiment where the corona charger 13 uses the same power supply 12 as the corona charger 13. It is, however, obvious for a person skilled in the art that also another power supply, with different voltage, may be used.

Figure 4:
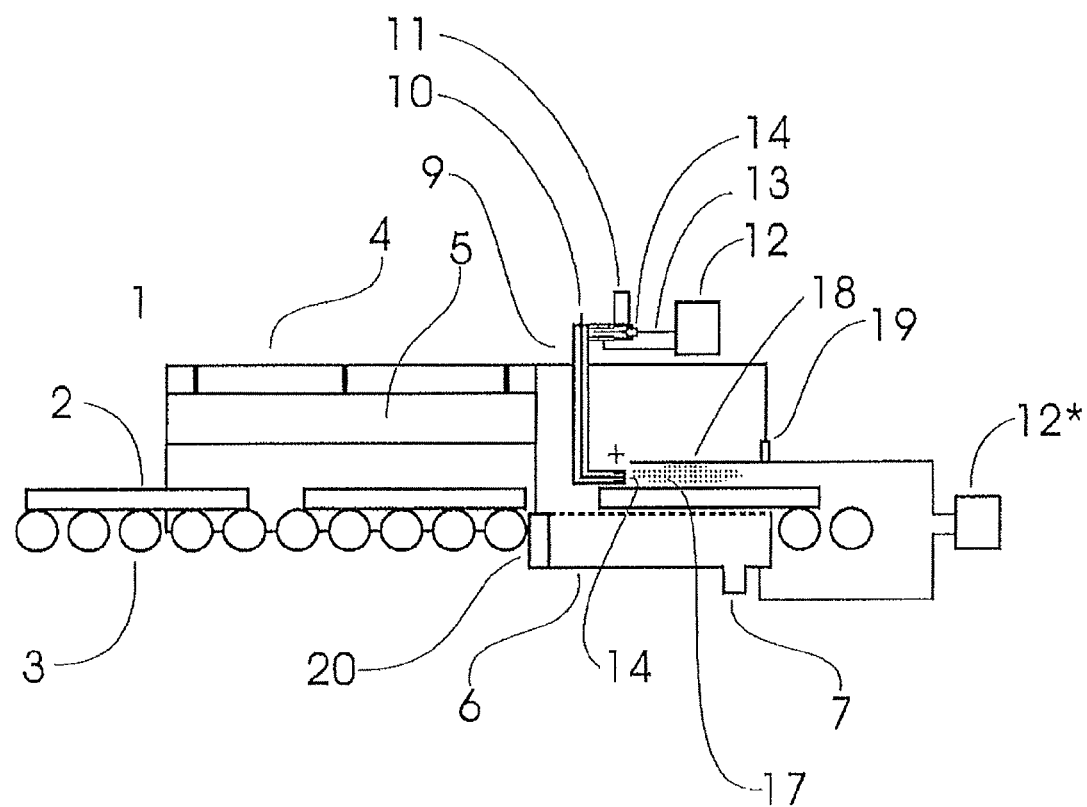
FIG. 4 shows a schematic drawing of an apparatus for proving a coating on the preferred surface using an external electric field according to the present invention.

FIG. 4, shows, in principle, an apparatus according to the present invention in which a separate, external, electrical field is used to enhance the deposition of the charged droplets 17. The droplets are charged similarly as described in connection with FIG. 1. Also glass heating, floating and trans-porting may be carried out similarly as in FIG. 1. The high-velocity droplets enter an electrical field generated between the first electrode 18, which is separated from the casing of the coating unit 9 by an electrical insulator 19 and connected to the first output of the power supply 12*, and the second electrode which in this case is formed by connecting the air support device 6 to the other output of the power supply 12* and electrically insulating the air support device 6 from the casing of the coating unit 9 by an electrical insulator 20. It is obvious for a person skilled in the art that the second output of the power supply 12* may be connected to various other pieces of the coating unit 9 as well, e.g. to one or more of the rollers 3 (electrically insulated from the other parts of the apparatus) which in turn connect the second output of the power supply 12* to the glass substrate touching the roller. Alternatively the first and second electrode may be separate electrodes arranged only for providing the separate electrical field. The electrodes are electrically insulated from the other parts of the apparatus 1. As shown in FIG. 4, the one or more atomizers 16 are arranged in connection with the separate electrical field such that droplets are into the separate electrical field.

The separate electrical field is arranged to receive at least a portion of the glass substrate 2. As the charged droplets 17 are formed into the separate electrical field, the electrostatic forces drive the droplets on the glass surface for providing a coating on the glass surface. This means that the glass substrate is transported or placed at least partly into the separate electrical field for depositing the droplets on the glass surface. The glass substrate is thus preferably placed between the first and second electrodes forming the separate electrical field. The electrical field is on the other hand implemented so that it will drive the charged droplets towards the glass surface. The charged droplets 17 are fed into the separate electrical field for depositing at least a fraction of the electrically charged droplets 17 on a portion of the glass surface by electrostatic forces. The liquid raw material may also be atomized into the separate electrical field, thus the charged droplets 17 are formed into the separate electrical field. Therefore the atomizer 16 is arranged in connection with the separate electrical field. The atomizer may thus be arranged such that the atomizers atomize the liquid raw materials into the separate electrical field, between the first and second electrodes.

The present invention further provides a process for coating glass using at least one or more liquid raw materials which react essentially on at least a portion of the glass surface forming a coating on it. In the process atomizing at least a part of the liquid raw materials is atomized to droplets 17 with one or more two-fluid atomizer 16. At least a fraction of the gas used in the one or more two-fluid atomizers 16 is electrically charged such that at least a fraction of the droplets 17 become electrically charged during or after the atomization. The process further comprises providing a separately created electrical field and forming the droplets 17 with the two-fluid atomizer 16 into the separately created electrical field for depositing at least a fraction of the electrically charged droplets 17 on the said portion of the glass surface by electrostatic forces.

In the process the glass 2 may be heated to at least the annealing temperature of the said glass 2 before depositing the electrically charged droplets 17 on the said portion of the glass surface. Also the atomized and electrically charged droplets 17 may be heated, for example by heated atomizing gas. According to the process of the present invention at least a portion of the glass 2 is arranged into the separately created electrical field for depositing at least a fraction of the electrically charged droplets 17 on the said portion of the glass surface by electrostatic forces. The glass is preferably arranged to be received between the first and second electrode providing the separate electrical field.

The corona discharge electrode and its counter electrode may be positioned in various different ways not described in the previous embodiments. Thus it is e.g. possible to connect the counter electrode to a plate outside the glass substrate. By combining, in various ways, the modes and structures disclosed in connection with the different embodiments of the invention presented above, it is possible to produce various embodiments of the invention in accordance with the spirit of the invention. Therefore, it will be obvious to a person skilled in the art that, as the technology advances, the inventive concept can be implemented in various ways. The invention and its embodiments are not limited to the examples described above but may vary within the scope of the claims.

It will be obvious to a person skilled in the art that, as the technology advances, the inventive concept can be implemented in various ways. The invention and its embodiments are not limited to the examples described above but may vary within the scope of the claims.

The invention claimed is:

1. A process for coating glass using at least one or more liquid raw materials which react essentially on at least a portion of the glass surface forming a coating on it, the process comprising:
    atomizing at least a part of the liquid raw materials to droplets with one or more two-fluid atomizer; and
    electrically charging at least a fraction of a gas used in the one or more two-fluid atomizer with charging means such that at least a fraction of the droplets become electrically charged during or after the atomization,
    providing an electrical field created separately from the charging means; and
    feeding the droplets into the separately created electric field using the one or more two-fluid atomizer for depositing at least a fraction of the electrically charged droplets on the portion of the glass surface by electrostatic forces provided with the separate electric field.

2. A process according to claim 1, comprising atomizing the liquid raw material into the separate created electrical field with the one or more two-fluid atomizer.

3. A process according to claim 1, comprising heating the glass or the glass surface to substantially the annealing temperature or to at least the coating temperature of the glass before depositing the electrically charged droplets on the said portion of the glass surface.

4. A process according to claim 3, comprising heating the glass to a coating temperature of at least 100° C.

5. A process according to claim 1, comprising heating the atomized and electrically charged droplets.

6. A process according to claim 5, comprising heating the atomized and electrically charged droplets by a heated atomizing gas.

7. A process according to claim 1, comprising arranging at least a portion of the glass into the separately created electrical field for depositing at least a fraction of the electrically charged droplets on the at least a portion of the glass surface by electrostatic forces.

8. A process according to claim 1, comprising charging the at least a fraction of the gas used in the two-fluid atomizer by corona charging.

9. A process according to claim 3, comprising heating the glass to a coating temperature of at least 200° C.

10. A process according to claim 3, comprising heating the glass to a coating temperature of at least 300° C.

11. A process for coating glass using at least one or more liquid raw materials which react essentially on at least a portion of the glass surface forming a coating on it, the process comprising:
   atomizing at least a part of the liquid raw materials into droplets with one or more two-fluid atomizer; and
   electrically charging at least a fraction of a gas used in the one or more two-fluid atomizers with charging means such that at least a fraction of the droplets become electrically charged during or after the atomization;
   providing a separate electric field between a first and second electrode separately from the charging means;
   receiving at least the said portion of the glass between the first and second electrode; and
   feeding the droplets into the separately created electric field between the first and second electrode using the two-fluid atomizer for depositing at least a fraction of the electrically charged droplets on the said portion of the glass surface by electrostatic forces provided with the separate electric field.

12. A process for coating glass in a coating unit using at least one or more liquid raw materials which react essentially on at least a portion of the glass surface forming a coating on it, the process comprising:
   providing a separate electric field in the coating unit;
   atomizing at least a part of the liquid raw materials into droplets with one or more two-fluid atomizer and electrically charging at least a fraction of a gas used in the one or more two-fluid atomizer with charging means separately from the separate electric field such that at least a fraction of the droplets become electrically charged during or after the atomization,
   carrying out the atomization of the liquid raw material directly into the separate electric field; and
   depositing at least a fraction of the electrically charged droplets on the said portion of the glass surface by electrostatic forces provided with the separate electric field.

13. A process for coating glass using at least one or more liquid raw materials which react essentially on at least a portion of the glass surface forming a coating on it, the process comprising:
   atomizing at least a part of the liquid raw materials to droplets with one or more two-fluid atomizer; and
   electrically charging at least a fraction of a gas used in the one or more two-fluid atomizer with a corona electrode such that at least a fraction of the droplets become electrically charged during or after the atomization;
   providing a separate electric field created separately from the corona electrode; and
   feeding the droplets into the separately created electric field using the two-fluid atomizer for depositing at least a fraction of the electrically charged droplets on the portion of the glass surface by electrostatic forces provided with the separate electric field.

14. A process for coating glass using at least one or more liquid raw materials which react essentially on at least a portion of the glass surface forming a coating on it, the process comprising:
   providing a separate electric field between a first and second electrode;
   receiving at least a portion of the glass between the first and second electrode; and
   atomizing at least a part of the liquid raw materials into droplets with one or more two-fluid atomizer and electrically charging at least a fraction of a gas used in the one or more two-fluid atomizer with charging means separate from the first and second electrode providing the separate electric field such that at least a fraction of the droplets become electrically charged during or after the atomization,
   carrying out the atomization of the liquid raw material directly into the separate electric field between the first and second electrode with the one or more two-fluid atomizer arranged in connection with the separate electric field such that droplets are formed into the separate electric field between the first and second electrode; and
   depositing at least a fraction of the electrically charged droplets on the said portion of the glass surface by electrostatic forces provided with the separate electric field between the first and second electrode.

* * * * *